(12) United States Patent
Banikazemi

(10) Patent No.: US 9,740,603 B2
(45) Date of Patent: Aug. 22, 2017

(54) MANAGING CONTENT IN PERSISTENT MEMORY MODULES WHEN ORGANIZATION OF THE PERSISTENT MEMORY MODULES CHANGES

(71) Applicant: International Business Machines Corporation, Armonk, NY (US)

(72) Inventor: Mohammad Banikazemi, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/819,923

(22) Filed: Aug. 6, 2015

(65) Prior Publication Data
US 2017/0038983 A1    Feb. 9, 2017

(51) Int. Cl.
*G06F 3/06* (2006.01)
*G06F 12/02* (2006.01)
*G06F 12/06* (2006.01)

(52) U.S. Cl.
CPC ........... *G06F 12/02* (2013.01); *G06F 3/0619* (2013.01); *G06F 3/0632* (2013.01); *G06F 12/0607* (2013.01)

(58) Field of Classification Search
CPC .... G06F 3/0635; G06F 3/0664; G06F 3/0688; G06F 12/0246; G06F 12/0292; G06F 12/0607; G06F 12/0623; G06F 12/0646; G06F 11/1402; G06F 11/1448; G06F 11/1469
See application file for complete search history.

(56) References Cited

U.S. PATENT DOCUMENTS

| 7,133,960 | B1 * | 11/2006 | Thompson | G06F 12/0623 711/105 |
|---|---|---|---|---|
| 7,234,061 | B1 | 6/2007 | Diab et al. | |
| 7,500,070 | B2 | 3/2009 | Schilling et al. | |
| 7,721,011 | B1 | 5/2010 | Sutera | |
| 8,321,639 | B2 | 11/2012 | Lund et al. | |
| 2009/0254732 | A1 * | 10/2009 | Dang | G06F 11/006 711/172 |
| 2012/0131236 | A1 | 5/2012 | Jabori et al. | |

(Continued)

FOREIGN PATENT DOCUMENTS

EP            1739535 A2     1/2007

OTHER PUBLICATIONS

J. Leslie Keedy et al., "Persistent Protected Modules and Persistent Processes as the Basis for a More Secure Operating System," Proceedings of the Twenty-Fifth Hawaii International Conference on System Science, vol. 1, pp. 747-756, Jan. 1992.

*Primary Examiner* — Hal Schnee
(74) *Attorney, Agent, or Firm* — Jennifer R. Davis; Michael J. Chang, LLC

(57) ABSTRACT

Techniques for managing content stored on persistent memory modules so as to ensure that the content can be accessed from the persistent memory modules in the correct order are provided. In one aspect, a method for managing content stored on persistent memory modules is provided. The method includes the step of: on each of the persistent memory modules, storing configuration data relating to an order in which the content is stored on the persistent memory modules. A method for managing content stored on persistent memory modules in a system is also provided.

20 Claims, 4 Drawing Sheets

(56) References Cited

U.S. PATENT DOCUMENTS

| | | | |
|---|---|---|---|
| 2012/0233396 A1 | 9/2012 | Flynn et al. | |
| 2013/0166860 A1* | 6/2013 | Owaki | G06F 12/0607 |
| | | | 711/157 |
| 2013/0179753 A1 | 7/2013 | Flynn et al. | |
| 2013/0205086 A1* | 8/2013 | Brown | G06F 3/0604 |
| | | | 711/114 |
| 2016/0011802 A1* | 1/2016 | Berke | G06F 3/0619 |
| | | | 711/166 |
| 2016/0179375 A1* | 6/2016 | Kirvan | G06F 3/0685 |
| | | | 711/153 |

* cited by examiner

| Block number | Real block number |
|---|---|
| 0 | 0 |
| 1 | 2 |
| 2 | 1 |
| 3 | 3 |

MANAGING CONTENT IN PERSISTENT MEMORY MODULES WHEN ORGANIZATION OF THE PERSISTENT MEMORY MODULES CHANGES

FIELD OF THE INVENTION

The present invention relates to persistent memory, and more particularly, for using persistent memory as a collection of smaller memory modules, including techniques for managing content stored on persistent memory modules so as to ensure that the content can be accessed from the persistent memory modules in the correct order.

BACKGROUND OF THE INVENTION

Persistent memory modules, such as dual in-line memory modules (DIMMs), are becoming more widely available. Unlike volatile memory, data is preserved on the persistent memory modules and the modules can be moved from one system to another.

Once moved, the location of the DIMMs on the new system may be different from that in the original system. Thus, the persistent memory might appear in a new location of the address space. More importantly, the relative location of these DIMMs in the address space may change.

Accordingly, in order to use persistent memory as part of the memory system in computers, one needs to be able to access data on it after the persistent memory modules are moved to a different computer. This need may arise due to the failure of the original server or due to maintenance and upgrade of servers.

Therefore, techniques that establish an organization among the persistent memory modules in a system that can be used after the modules have been moved to a new system would be desirable.

SUMMARY OF THE INVENTION

The present invention provides techniques for managing content stored on persistent memory modules so as to ensure that the content can be accessed from the persistent memory modules in the correct order. In one aspect of the invention, a method for managing content stored on persistent memory modules is provided. The method includes the step of: on each of the persistent memory modules, storing configuration data relating to an order in which the content is stored on the persistent memory modules.

In another aspect of the invention, a method for managing content stored on persistent memory modules in a system is provided. The method includes the step of: determining an organization of the persistent memory modules in the system; and reordering the content to provide a correct organization of the persistent memory modules in the system if the organization of the persistent memory modules in the system has changed, wherein the content is reordered based on configuration data stored on each of the persistent memory modules relating to an order in which the content was stored on the persistent memory modules prior to reorganization.

A more complete understanding of the present invention, as well as further features and advantages of the present invention, will be obtained by reference to the following detailed description and drawings.

DETAILED DESCRIPTION OF PREFERRED EMBODIMENTS

As provided above, persistent memory modules—such as dual in-line memory modules (DIMMs)—preserve data, even when the modules are moved from one system to another. However, once the modules are moved to a new system (i.e., from one server to another), the challenge is in being able to deduce the correct ordering of the modules since they might be re-arranged in the new system. Namely, since stored information is interleaved in the memory modules, one must know for the new system the correct order in which to access the modules so that the information is continuous.

Advantageously, provided herein are techniques for storing information on the persistent memory related to the configuration on the modules, and for how that information can be used after the memory modules have been moved. More specifically, the present techniques provide a mechanism to make each persistent memory module contain enough information such that as the modules get moved to any system they can be recognized and properly organized. Thus, for example, when the modules are moved to a new server, the new server can use this information to figure out the correct ordering of the modules.

Figure 1:
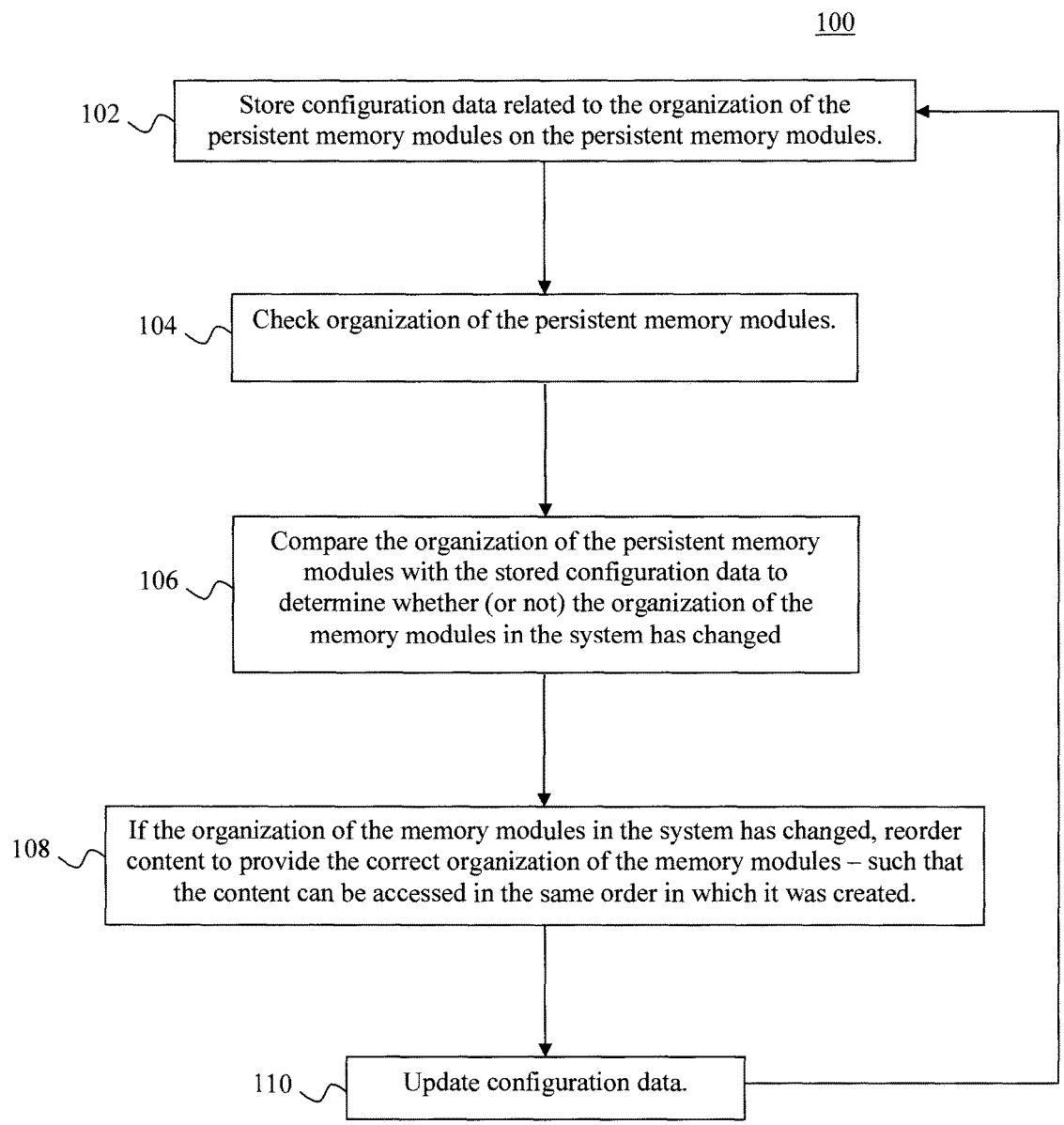
FIG. 1 is a diagram illustrating an exemplary methodology for managing content stored on persistent memory modules in a system according to an embodiment of the present invention.

By way of example only, FIG. 1 is a diagram illustrating an exemplary methodology 100 for managing persistent memory modules in accordance with an exemplary embodiment of the present techniques. In step 102, information regarding a configuration of the persistent memory modules is stored on the persistent memory modules themselves (also referred to herein as "configuration data"). This permits the configuration information to be carried along with the modules, for instance, when the modules are moved to a new system. As provided above, the persistent memory modules may be, for example, DIMMs.

The configuration data relates generally to the ordering of the memory modules with regard to information/content stored on the memory modules. For instance, a large collection of persistent memory modules may be used to store information/content, wherein the content is interleaved among the collection of memory modules. At the time the information is stored to the memory modules, in accordance with the present techniques, the configuration data is also stored on each of the memory modules. The configuration data will basically specify the ordering of the memory modules storing the information, such that if/when the memory modules are moved to another system/server data can be retrieved from the memory modules in the proper order. As known in the art, addresses are used to uniquely locate data stored in memory. Thus, a goal here is to be able to preserve the order in which the data is retrieved to that in which the data was written to the persistent memory modules.

Figure 2:
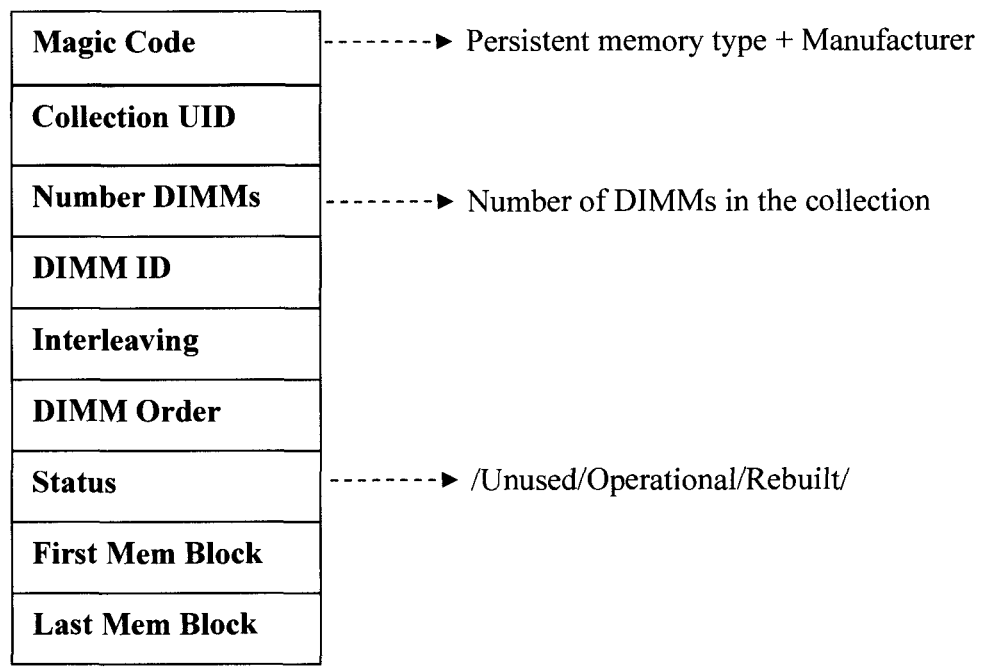
FIG. 2 is a diagram illustrating exemplary configuration data that may be stored directly on the persistent memory modules according to an embodiment of the present invention.

By way of example only, FIG. 2 illustrates an exemplary set of configuration data that may be stored on each of the persistent memory modules in accordance with step 102. As shown in FIG. 2, the configuration information can include general specifications for the memory module such as the persistent memory type (e.g., DIMM), the module's manufacturer, etc. These module specifications are also commonly referred to as "Magic Code" data. See, for example, U.S. Pat. No. 7,234,061 issued to Diab et al., entitled "Methods and Apparatus for Verifying Modules from Approved Vendors."

As provided above, information is often stored to a collection of memory modules. Thus the configuration data can also include an ID that uniquely identifies (i.e., a UID) the collection of memory modules storing the information. By way of example only, if four persistent memory modules (e.g., DIMM-1 through DIMM-4) are used to store the information then a UID of that particular collection of memory modules may be part of the configuration data. In that regard, the configuration data preferably indicates the number of persistent memory modules in the collection (see FIG. 2 "Number of DIMMs in the collection"). For instance, in the example above the information is stored on a collection of four persistent memory modules (e.g., DIMM-1 through DIMM-4).

As with an UID identifying the collection of modules containing the information, the ID of each individual persistent memory module in the collection can be included in the configuration data. See FIG. 2 "DIMM ID."

Notably, since the stored information is interleaved among the collection of memory modules (see FIG. 2 "Interleaving"), then the configuration data needs to include the order in which the memory modules need to be accessed so as to preserve the information in the order it was originally created. This is the sequence number of a DIMM in the collection. To again use the above example of a collection of four persistent memory modules (e.g., DIMM-1 through DIMM-4)—if the information stored in this collection of modules overlaps multiple modules (i.e., the addresses of the stored information are interleaved among the modules), then the order in which the modules need to be accessed to properly access the stored information needs to be known. This will serve to 'recreate' the original order of the modules prior to their movement to another system. So for instance, say the order of the DIMMs in the example was DIMM-1, -2, -3, -4 when the data was stored. However, when the DIMMs are moved to another system that order is changed. Thus, one must know the correct order (in this case DIMM-1, -2, -3, -4) so as to be able to correctly access the stored data from the persistent memory modules. See FIG. 2 "DIMM Order."

As shown in FIG. 2, in addition to the ordering of the memory modules, it may be useful to store some additional configuration data. One useful piece of information is the status of the memory modules (see FIG. 2 "Status"). As will be described in detail below, one exemplary implementation of the present techniques involves, when the memory modules are moved to a new system (and potentially in a different order), writing the content from the modules onto a disk. The memory modules are then marked as being rebuilt. The content can then be restored in the correct order on the modules, and the modules marked as operational. Further, if any of the modules are unused in the new system, they can be marked as such. Thus, this status information (i.e., Unused, Operational, Rebuilt, etc.) can also be stored as part of the configuration data.

Further, as shown in FIG. 2, the first and last block in each of the memory modules that is being used to store the content may also be included in the configuration data. See, for example, FIG. 2 "First Mem Block" and "Last Mem Block." This is in case there is more information (metadata) that needs to be stored on a DIMM for successful recovery/reorganization (other than what is shown in FIG. 2).

According to an exemplary embodiment, the Serial Presence Detect (SPD) manufacturer-specific data area in each of the persistent memory modules is used to store this configuration data. The SPD area is a good location for storing such configuration data since this area is not part of the memory used by the computer, but typically just includes manufacturer identification information and the specifications of the memory module. Alternatively, according to another exemplary embodiment, the configuration data is stored in a predefined location in each of the memory modules. This may be the case where manufacturer data uses a big enough portion of the SPD that there is not enough space for storing the DIMM order (sequence number in the order) or the status, etc. Accordingly, the data may be stored, for example, in the first (or last) block of a memory module.

This configuration data (stored on each of the memory modules) can then be accessed whenever the modules are reconfigured (such as when the modules are moved to a new system) in order to be able to correctly order the stored content. It is also notable that the configuration data is preferably updated, e.g., when a reconfiguration occurs, in order to reflect the most up-to-date configuration of the modules.

Referring back to FIG. 1, the process for managing content stored on the persistent memory modules will now be described, including the steps taken when a reconfiguration of the modules occurs (such as when the modules are moved to a new system and/or reorganized in an existing system). For example, in step 104 the organization (i.e., the physical location) of the persistent memory modules in the system is determined. For example, it may be determined in step 104 which module is in the physical location for module 0, which module is in the physical location of module 1, and so on.

By way of example only, step 104 may be performed whenever persistent memory modules are detected in the system. For instance, step 104 may be performed automatically when a system detects that new persistent memory modules have been introduced to the system. Take, for example, the scenario when new persistent memory modules (such as DIMMs) are moved to a new server. The new server may then, upon detection of the new memory modules, check the organization of the newly introduced modules. Alternatively, rather than automatically assessing the organization of the modules, a program may be run (e.g., by a user) whenever persistent memory modules are moved into a system. Either way, the (new) system/server is configured in step 104 to assess the organization of the persistent memory modules.

In step 106, the organization (i.e., physical location of each) of the memory modules (determined in step 104) is compared with the configuration data (from step 102—which indicates which modules should be where) to determine whether the organization of the persistent memory modules in the system has changed (i.e., to determine whether a reorganization of the memory modules has occurred). For instance, when the memory modules are moved from one system to another, it is oftentimes the case that a re-ordering of the memory modules occurs (such that the ordering of the memory modules in the new system is different from the ordering of the memory modules in the previous system). However, there is a chance that the same ordering might be implemented in both systems. This determination is made via step 106 to determine whether (or not) the organization of the persistent memory modules in the system has changed based on the stored configuration data.

Based on the outcome of step 106, if the organization of the persistent memory modules in the system has changed, then in step 108 the content is reordered to provide a correct organization of the persistent memory modules in the (e.g., new) system (i.e., such that the content can be accessed in the same order in which it was created). Of course, if the organization of the memory modules in the system has not changed, then reordering of the content is not necessary.

If the organization of the memory modules has changed, and the content has been reordered, then the configuration data stored on the memory modules should also be updated (i.e., with the new order in which the content is stored on the persistent memory modules). This occurs in step 110. To use a simple example, if the ordering of the DIMMs has changed from DIMM-1, -2, -3, -4, to DIMM-1, -3, -4, -2 (e.g., in the new system) then the configuration data stored on each of the DIMMs should be updated to reflect this new organization. The new configuration data can be stored on each of the memory modules (as per step 102), and the process can be repeated vis-à-vis further reorganizations of the modules. See FIG. 1.

A number of different ways are provided herein for how step 108 may be carried out to re-order the content based on the configuration data stored in the memory modules. One exemplary embodiment is now described by way of reference to methodology 300 of FIG. 3. As provided above, methodology 300 may be performed when the organization of the memory modules in the system has changed—for instance when the memory modules have been moved to a new system/server and the ordering of the modules has been changed.

Figure 3:
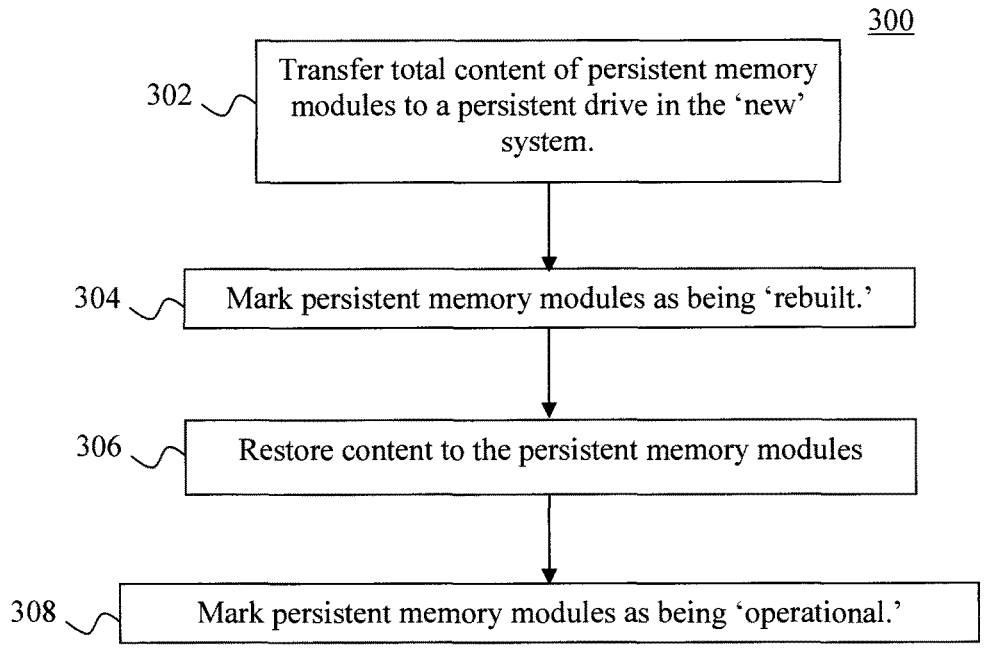
FIG. 3 is a diagram illustrating an exemplary methodology for re-ordering the content based on the configuration data stored on the persistent memory modules according to an embodiment of the present invention.

As shown in FIG. 3, in step 302 the total content of the memory modules is transferred to a persistent drive in the 'new' system. By 'new' system it is meant generally to be a system/server in which the memory modules that have been reorganized are present. Namely, as highlighted above, the memory modules might in fact be reorganized within the same system/server. In that case, the 'new' system isn't a different system, but merely a new organization of the modules within the same system. Alternatively, as provided above, the modules may also be moved to a new/different system/server. In either case, the system in which the memory modules have been reorganized is referred to herein as the new system.

The configuration data stored on each of the modules (see step 102 of FIG. 1—described above), can be used to establish the correct order in which the content is transferred from the memory modules to the persistent drive so as to result in the content being saved on the persistent drive in the correct order, i.e., the order in which it was created.

Once the content has been removed from the persistent memory modules and dumped on the persistent drive (as per step 302), in step 304 the memory modules are each marked as being rebuilt. As provided above, the status of the memory modules (such as rebuilt) can be included in the configuration data. Thus, if the status information is part of the configuration data stored on each of the modules, then the configuration should be updated (e.g., as per step 110 of FIG. 1—described above) with the current status information: rebuilt.

In step 306, the content is then restored (from the persistent drive) to the memory modules in the correct order. Namely, it is assumed in this example that the memory modules have been reorganized in the new system. Since, the content has been placed on the persistent drive in the correct order (see step 304), then the content in step 306 will be restored to the (reorganized) modules also in the correct order. Of course, the configuration data will need to be updated with the new ordering of the modules (e.g., as per step 110 of FIG. 1—described above).

Once the content has been restored to the memory modules in the correct order, in step 308 the memory modules are each marked as being operational in the new system. As provided above, the status of the memory modules (such as operational) can be included in the configuration data. Thus, if the status information is part of the configuration data stored on each of the modules, then the configuration should be updated (e.g., as per step 110 of FIG. 1—described above) with the current status information: operational.

Methodology 300 basically serves to reconstruct the content such that the content is stored on the persistent memory modules in the correct order in the new system. Namely, by dumping the content onto a persistent drive (in the correct order—see above), the content can be re-written onto the reorganized memory modules in the same order in which it was originally created. Reconstructing the content (e.g., via a persistent drive) is, however, not the only way anticipated herein for re-ordering the content based on the configuration data stored in the memory modules (e.g., as per step 108 of FIG. 1).

Figure 4:
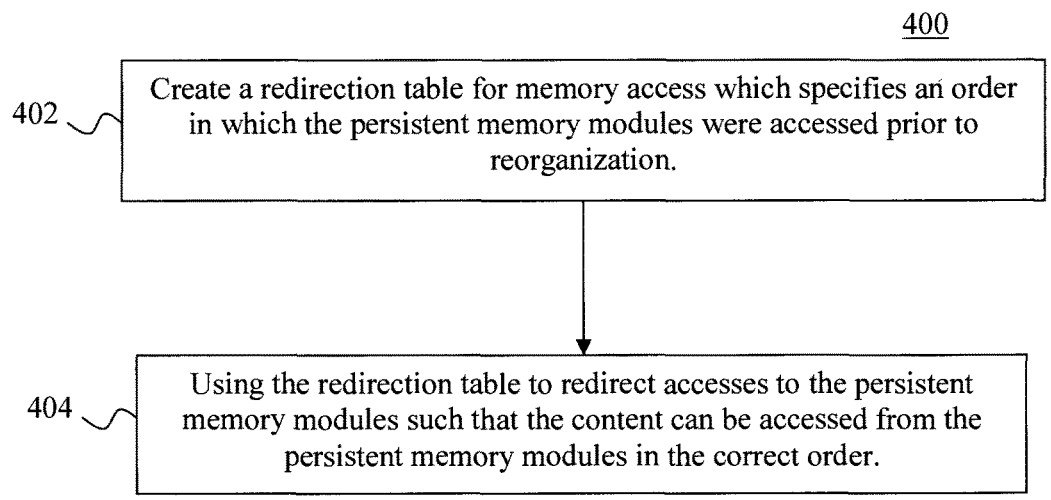
FIG. 4 is a diagram illustrating another exemplary methodology for re-ordering the content based on the configuration data stored on the persistent memory modules according to an embodiment of the present invention.

Alternatively, methodology 400 of FIG. 4 provides another possible solution to maintain the content in the correct order following a reorganization of the memory modules (such as when the memory modules are moved to a new system). Methodology 400 generally involves creating a redirection table for memory access, such that the memory modules, after reorganization, can still be accessed in the same order as prior to the reorganization despite their current configuration in the new system. Namely, as per step 402, the redirection table is created based on the configuration data stored on each of the memory modules (see step 102 of FIG. 1) which specifies the correct order in which the memory modules need to be accessed in order to properly access the content. The redirection table may be created in hardware, firmware, or software.

In step 404, the content is reordered (as per step 108 of FIG. 1) by using the redirection table when accessing the memory modules (which are assumed in this example to be reorganized in the new system) such that the content can be accessed from the memory modules in the correct order. To again refer to the example provided above for illustration, if the content was stored (prior to reconfiguration) on the memory modules in the following order: DIMM-1, -2, -3, -4, then the redirection table would specific accessing the memory modules in the new system in that same order, even if the organization of the modules is different in the new system. Thus, the content as stored in the new system is 'reordered' so as to access it in the correct form. An exemplary redirection table is provided in FIG. 6—described below.

Generally, each of methodology 100 of FIG. 1, methodology 300 of FIG. 3, and methodology 400 of FIG. 4 may be performed by a system (i.e., server) in which the memory modules are present. See, for example, FIG. 5, described below. This system/server might be one in which the modules are reorganized and/or, as provided above, a system/server to which the modules have been moved.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figures 5, 6:
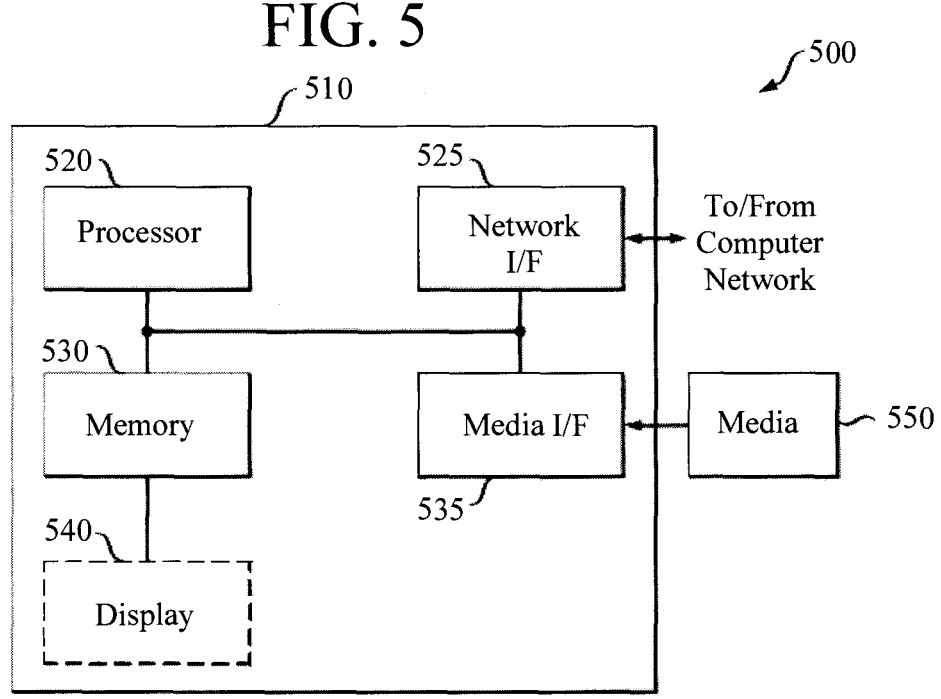
FIG. 5 is a diagram illustrating an exemplary apparatus for performing one or more of the methodologies presented herein according to an embodiment of the present invention.
FIG. 6 is a diagram illustrating an exemplary redirection table according to an embodiment of the present invention.

Turning now to FIG. 5, a block diagram is shown of an apparatus 500 for implementing one or more of the methodologies presented herein. Apparatus 500 generally represents any system/server in which the present persistent memory modules may be present. See above. Thus, by way of example only, apparatus 500 can be configured to implement one or more of the steps of methodology 100 of FIG. 1, methodology 300 of FIG. 3, and/or methodology 400 of FIG. 4. For instance, apparatus 500 is representative of a server in which the modules are reorganized and/or, as provided above, a system/server to which the modules have been moved.

Apparatus 500 includes a computer system 510 and removable media 550. Computer system 510 includes a processor device 520, a network interface 525, a memory 530, a media interface 535 and an optional display 540. Network interface 525 allows computer system 510 to connect to a network, while media interface 535 allows computer system 510 to interact with media, such as a hard drive or removable media 550.

Processor device 520 can be configured to implement the methods, steps, and functions disclosed herein. The memory 530 could be distributed or local and the processor device 520 could be distributed or singular. The memory 530 could be implemented as an electrical, magnetic or optical memory, or any combination of these or other types of storage devices. Moreover, the term "memory" should be construed broadly enough to encompass any information able to be read from, or written to, an address in the addressable space accessed by processor device 520. With this definition, information on a network, accessible through network interface 525, is still within memory 530 because the processor device 520 can retrieve the information from the network. It should be noted that each distributed processor that makes up processor device 520 generally contains its own addressable memory space. It should also be noted that some or all of computer system 510 can be incorporated into an application-specific or general-use integrated circuit.

Optional display 540 is any type of display suitable for interacting with a human user of apparatus 500. Generally, display 540 is a computer monitor or other similar display.

As provided above, a redirection table for memory access may be used in accordance with an exemplary embodiment to maintain the content in the correct order following a reorganization of the memory modules (such as when the memory modules are moved to a new system). FIG. 6 is a diagram illustrating an exemplary redirection table 600. As shown in FIG. 6, the redirection table may be something as simple as a two column table where a given memory block number is converted to another. Redirection table 600 is for a 4-block memory system. Based on redirection table 600, for example, if the memory block 0 and 1 are referenced—then physical memory block 0 and 1 are accessed respectively. Access to block 1 leads to accessing physical block 2, and accessing block 2 leads to accessing block 1. So essentially the memory blocks are reordered with any reordering in the content or location of memory modules.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method for managing content stored on persistent memory modules, the method comprising the step of:
    on each of the persistent memory modules, storing configuration data relating to an order in which the content is stored on the persistent memory modules, wherein the storing of the configuration data is performed at a time the content is stored on each of the persistent memory modules such that the content can be retrieved in a same order in which the content was originally written to the persistent memory modules whenever an ordering of the persistent memory modules changes.

2. The method of claim 1, wherein the persistent memory modules comprise dual in-line memory modules (DIMMs).

3. The method of claim 1, wherein the configuration data is stored in a Serial Presence Detect (SPD) manufacturer-specific data area in each of the persistent memory modules.

4. The method of claim 1, wherein the configuration data is stored in a predefined location in each of the persistent memory modules.

5. The method of claim 1, further comprising the step of:
    updating the configuration data whenever a reconfiguration of the persistent memory modules occurs, wherein the reconfiguration of the persistent memory modules comprises a change in the ordering of the persistent memory modules, and wherein the configuration data is updated to reflect a new order in which the content is stored on the persistent memory modules.

6. A method for managing content stored on persistent memory modules in a system, the method comprising the steps of:
    determining an organization of the persistent memory modules in the system; and
    reordering the content to provide a correct organization of the persistent memory modules in the system if the organization of the persistent memory modules in the system has changed, wherein the content is reordered based on configuration data stored on each of the persistent memory modules relating to an order in which the content was stored on the persistent memory modules prior to reorganization, wherein the configuration data is stored on each of the persistent memory modules at a time the content is stored on each of the persistent memory modules such that the content can be retrieved in a same order in which the content was originally written to the persistent memory modules whenever an ordering of the persistent memory modules changes.

7. The method of claim 6, wherein the persistent memory modules comprise DIMMs.

8. The method of claim 6, wherein the configuration data is stored in a SPD manufacturer-specific data area in each of the persistent memory modules.

9. The method of claim 6, wherein the determining and reordering steps are performed when the persistent memory modules are first moved into the system.

10. The method of claim 6, further comprising the steps of:
    transferring the content, in a correct order, from the persistent memory modules to a persistent drive;
    restoring the content to the persistent memory modules, in the correct order, wherein the organization of the persistent memory modules in the system has changed to a different ordering of thepersistent memory modules; and updating the configuration data to reflect a new order in which the content is stored on the persistent memory modules.

11. The method of claim 10, further comprising the step of:
marking a status of each of the persistent memory modules as rebuilt after the content has been transferred from the persistent memory modules to the persistent drive.

12. The method of claim 10, further comprising the step of:
marking a status of each of the persistent memory modules as operational after the content has been restored to the persistent memory modules.

13. The method of claim 6, further comprising the step of:
comparing the organization of the memory modules with the configuration data to determine if the organization of the persistent memory modules in the system has changed.

14. The method of claim 6, further comprising the steps of:
creating a redirection table for memory access based on the configuration data, wherein the redirection table for memory access specifies an order in which the persistent memory modules were accessed prior to the reorganization; and
using the redirection table for memory access to redirect access to the persistent memory modules such that the content is accessed from the persistent memory modules in the order in which the content was stored on the persistent memory modules prior to the reorganization even when the organization of the persistent memory modules in the system has changed to a different ordering of the persistent memory modules.

15. A computer program product for managing content stored on persistent memory modules in a system, the computer program product comprising a computer readable storage medium having program instructions embodied therewith, the program instructions executable by a computer to cause the computer to:
determine an organization of the persistent memory modules in the system; and
reorder the content to provide a correct organization of the persistent memory modules in the system if the organization of the persistent memory modules in the system has changed, wherein the content is reordered based on configuration data stored on each of the persistent memory modules relating to an order in which the content was stored on the persistent memory modules prior to reorganization, wherein the configuration data is stored on each of the persistent memory modules at a time the content is stored on each of the persistent memory modules such that the content can be retrieved in a same order in which the content was originally written to the persistent memory modules whenever an ordering of the persistent memory modules changes.

16. The computer program product of claim 15, wherein the persistent memory modules comprise DIMMs.

17. The computer program product of claim 15, wherein the program instructions further cause the computer to:
transfer the content, in a correct order, from the persistent memory modules to a persistent drive;
restore the content to the persistent memory modules, in the correct order, wherein the organization of the persistent memory modules in the system has changed to a different ordering of the persistent memory modules; and
update the configuration data to reflect a new order in which the content is stored on the persistent memory modules.

18. The computer program product of claim 15, wherein the program instructions further cause the computer to:
compare the organization of the memory modules with the configuration data to determine if the organization of the persistent memory modules in the system has changed.

19. The computer program product of claim 15, wherein the program instructions further cause the computer to:
create a redirection table for memory access based on the configuration data, wherein the redirection table for memory access specifies an order in which the persistent memory modules were accessed prior to the reorganization; and
use the redirection table for memory access to redirect access to the persistent memory modules such that the content is accessed from the persistent memory modules in the order in which the content was stored on the persistent memory modules prior to the reorganization even when the organization of the persistent memory modules in the system has changed to a different ordering of the persistent memory modules.

20. An apparatus for managing content stored on persistent memory modules in a system, the apparatus comprising:
a memory; and
at least one processor device, coupled to the memory, operative to:
determine an organization of the persistent memory modules in the system; and
reorder the content to provide a correct organization of the persistent memory modules in the system if the organization of the persistent memory modules in the system has changed, wherein the content is reordered based on configuration data stored on each of the persistent memory modules relating to an order in which the content was stored on the persistent memory modules prior to reorganization, wherein the configuration data is stored on each of the persistent memory modules at a time the content is stored on each of the persistent memory modules such that the content can be retrieved in a same order in which the content was originally written to the persistent memory modules whenever an ordering of the persistent memory modules changes.

* * * * *